Figure 3:
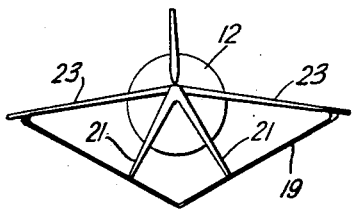

June 28, 1960     F. E. HANNING-LEE ET AL     2,942,810
HYDROFOIL CRAFT
Filed May 31, 1955     2 Sheets-Sheet 1
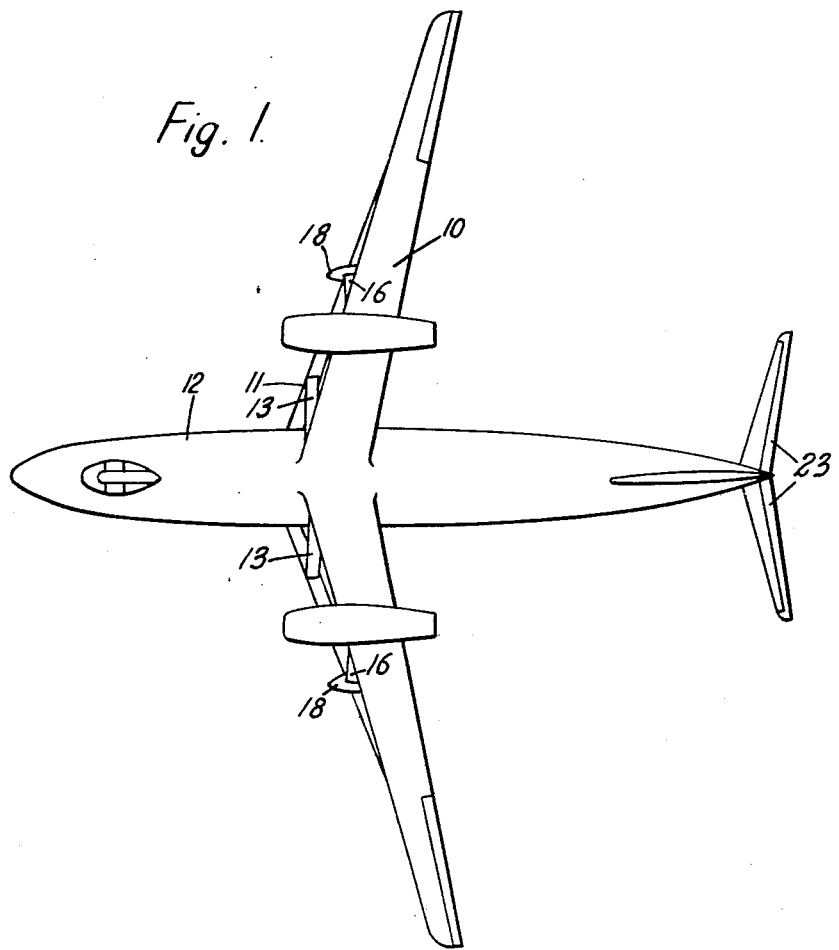
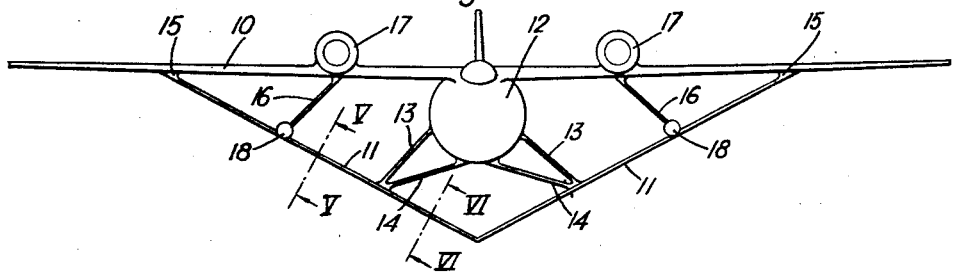
Inventors
Francis E. Hanning-Lee
Stella Hanning-Lee
By
Attorneys June 28, 1960   F. E. HANNING-LEE ET AL   2,942,810
HYDROFOIL CRAFT
Filed May 31, 1955   2 Sheets-Sheet 2

Inventors
Francis E. Hanning-Lee
Stella-Hanning-Lee
By

Attorneys

United States Patent Office 2,942,810
Patented June 28, 1960

2,942,810

HYDROFOIL CRAFT

Francis Edward Hanning-Lee and Stella Hanning-Lee, both of 81 Cadogan Square, London SW. 1, England Filed May 31, 1955, Ser. No. 512,237

Claims priority, application Great Britain June 4, 1954

8 Claims. (Cl. 244—105)

To enable the hulls of aircraft to be driven at high speed on water, they have been fitted with hydrofoils which act to lift the hull more or less clear of the water as the speed increases. With existing designs, however, it has been found that at speeds over about 60 m.p.h. in sheltered water, and over about 40 m.p.h. in rough water, a sudden loss of lift and stability has occurred due to entrained air and to cavitation.

According to the present invention, to avoid this sudden deterioration in performance and to improve its stability and safety at high speeds, an aircraft is provided with a hydrofoil having two ends which are attached to the mainplane on opposite sides of the hull, the hydrofoil extending downwards and inwards from each of its ends and passing under the aircraft hull. The tailplane or stabilizer of the aircraft may also be provided with a hydrofoil the ends of which are attached to the tailplane or stabilizer on opposite sides of the hull respectively, and which extends downwards and inwards from the said ends and passes under the aircraft hull. The main and tail hydrofoils strengthen respectively the main and tail planes and allow a far lighter wing to be designed for a given aspect ratio. Alternatively, a far higher aspect ratio can be used for a given wing weight. The hydrofoils have a threefold purpose, since in addition to their use as landing gear and as wing bracing struts, they also serve as aerodynamic lifting and stabilizing aerofoils, so that a monoplane fitted with the hydrofoils in the manner described has some of the attributes of a biplane. Preferably, V-shape foils are used both for the forward and the after hydrofoils, and the aspect ratio of the foils may be greater than 20 to 1. It will be appreciated that in such a case the hydrofoils would not retract, since they would be contributing to the lift, but in high speed aircraft where there is a large difference in the attitude of the aircraft in take-off and in flight, the high speed foils if left in their take-off position would have a negative angle of incidence in flight and, therefore, may be rotated to assume an angle of incidence which would contribute most to the performance of the aircraft in flight.

The included angle of the wedge of the high speed sections of the hydrofoils may be from 3 to 10 degrees, but 4 degrees is preferred. The angle of attack of the hydrofoils may be from 3 to 10 degrees but 4 degrees is preferred.

Figure 4:
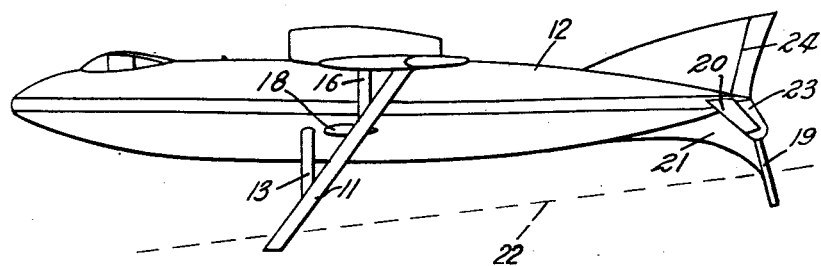
Figure 5:
Figure 6:
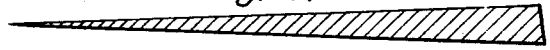
Figure 7:
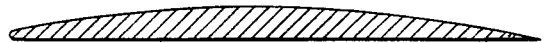

An example of an aircraft according to the present invention is shown in the accompanying drawings in which:

Figure 1 is a plan view of the aircraft;
Figure 2 is a view of the aircraft seen head on;
Figure 3 is a rear elevation of the tail of the aircraft;
Figure 4 is a side elevation;
Figure 5 is a section on the line V—V in Figure 2;
Figure 6 is a section on the line VI—VI in Figure 2; and
Figure 7 is an alternative section to Figure 6.

As seen in Figure 1 the aircraft is a high wing monoplane having a conventional wing 10 of unusually high aspect ratio. For subsonic aircraft this is preferably 20:1 or more. The main hydrofoils 11 are, as seen in Figure 2, of V-shape and are attached to the hull 12 by struts 13, 14 and to the main wing 10 at about semi-span 15, extending downwards and inwards from points between the wing tips and the mid points of the laterally extending members of the wing on each side of the hull. The hydrofoils are also braced to the wing by intermediate struts 16 which are attached to the wing at the engine nacelles 17. To help to maintain stability when the aircraft is stationary on the water, streamlined flotation tanks 18 are situated at the junctions of these struts 16 with the hydrofoils 11.

The parts of the hydrofoils between their junctions with the struts 13 and 14 have a hydrofoil section which is a 4 degree wedge having the sharp edge of the hydrofoil leading as shown in Figure 6. The parts of the hydrofoils 11 outboard of the junctions with the struts 13 have an aerofoil section, for example that shown in Figure 5, and thus act as additional lifting surfaces after they have emerged from the water as the aircraft rises on the lower part of the hydrofoils in taking off, and during flight. The main hydrofoils are swept forwards as shown in Figure 1 and Figure 4 so that the lowest point is ahead of the centre of gravity of the aircraft to prevent any danger of it pitching forwards when alighting.

The rear hydrofoils 19 are, as seen in Figure 3, also of V-shape and are attached to the tips of the tailplane 20. The hydrofoils are also braced to the tail of the hull 12 by ventral fins 21. The tail also has a high aspect ratio as seen in Figure 1 and the tailplanes are provided with the usual elevators 23. The rear edges of the ventral fins have rudders 24 which provide a means for steering the aircraft both in the air and on the water. As with the main hydrofoils the parts of the rear hydrofoils between the fins 21 are formed to a wedge section whereas the outer parts of the hydrofoils are formed to an aerofoil section.

In Figure 4 the approximate water level when the aircraft is taxi-ing at high speeds is indicated at 22 and it will be seen that the main hydrofoils 11 have a small positive angle of incidence to the water which is approximately 4 degrees.

For aircraft which taxi at water speeds of from 70 to 90 miles an hour an ogival hydrofoil section such as that shown in Figure 7, is preferred for the high speed parts of the hydrofoils instead of the wedge section. The wedge section is however, preferred for higher speeds.

Although the invention has been illustrated in connection with a so-called high wing monoplane, it obviously is not restricted thereto and may be adapted to any type of plane wherein the body projects below the under surface of the main supporting wing or wings.

We claim:

1. An aircraft of the high wing monoplane type having laterally extending wing members and a hull fitted with a pair of hydrofoils with their outer ends attached to the under sides of the wing members and each extending downwards and inwards from approximately the mid point of a wing member to a meeting point beneath the center line of the hull and in front of the center of gravity of the aircraft.

2. An aircraft according to claim 1, having lateral tail planes, in which the tail of the aircraft is also provided with a pair of hydrofoils extending downwards and inwards from the tips of the tail planes and braced to the tail of the hull by at least one ventral fin.

3. An aircraft having a hull and a mainplane comprising wing members extending transversely thereof and provided with a hydrofoil, said hydrofoil having two ends which are attached to the said wing members on opposite sides of said hull, and extending downwards and inwards from each of its ends and passing under said hull, support members extending from the hull to the hydrofoils and further support members extending from the hydrofoils to the wing members.

4. An aircraft according to claim 3, in which said hydrofoil is V-shaped, its two sides meeting to form the angle of the V beneath the center line and forward of the center of gravity of said hull.

5. An aircraft according to claim 4, in which said hydrofoil has an aspect ratio of at least 20 to 1 and in which said further support members are secured between said wing members and intermediate points on the sides of said hydrofoil.

6. An aircraft having a hull, a mainplane comprising wing members, a tailplane extending transversely of the hull, and forward and aft hydrofoils, said forward hydrofoil having two ends which are attached to said wing members on opposite sides of said hull and extending downwards and inwards from each of its ends and passing under said hull, said aft hydrofoil having two ends which are attached to the tailplane on opposite sides of said hull respectively, and extending downwards and inwards from said ends and passing under said hull, and support members extending from the hull to the hydrofoils.

7. An aircraft according to claim 6, in which said hydrofoil attached to said tailplane is V-shaped, its two sides meeting to form the angle of the V beneath the center line of said hull, and in which said support members for said aft hydrofoil are in the form of ventral fins on each side of its center line secured to said hydrofoil at points laterally spaced from said hull.

8. An aircraft of the monoplane type having a hull, wing members extending laterally from the hull, a pair of hydrofoils with their outer ends attached to the undersides of the wing members and each extending downwards and inwards from a point between the wing tip and the mid-point of the wing members to a meeting point beneath the center line of the hull, support members extending from the hull to the hydrofoils and further support members extending from the hydrofoils to the wing members.

References Cited in the file of this patent

UNITED STATES PATENTS

| | | |
|---|---|---|
| 1,995,089 | Bellanca | Mar. 19, 1935 |
| 2,533,925 | Fulton | Dec. 12, 1950 |
| 2,597,048 | Almquist | May 20, 1952 |

FOREIGN PATENTS

| | | |
|---|---|---|
| 318,858 | Great Britain | May 22, 1930 |
| 517,518 | Germany | Feb. 4, 1931 |
| 582,985 | Great Britain | Dec. 4, 1946 |
| 588,315 | Great Britain | May 20, 1947 |